(12) United States Patent
Gonzalez et al.

(10) Patent No.: US 11,927,688 B2
(45) Date of Patent: Mar. 12, 2024

(54) FIREARM DISCHARGE LOCATION SYSTEMS AND METHODS

(71) Applicant: Battelle Memorial Institute, Richland, WA (US)

(72) Inventors: Eric G. Gonzalez, Richland, WA (US); Michael S. Hughes, Richland, WA (US); Anton S. Sinkov, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 363 days.

(21) Appl. No.: 17/285,276

(22) PCT Filed: May 15, 2020

(86) PCT No.: PCT/US2020/033167
§ 371 (c)(1),
(2) Date: Apr. 14, 2021

(87) PCT Pub. No.: WO2020/236607
PCT Pub. Date: Nov. 26, 2020

(65) Prior Publication Data
US 2021/0389412 A1    Dec. 16, 2021

Related U.S. Application Data

(60) Provisional application No. 62/849,877, filed on May 18, 2019.

(51) Int. Cl.
*G01S 5/22* (2006.01)
*G01S 3/808* (2006.01)
(Continued)

(52) U.S. Cl.
CPC ................ *G01S 5/22* (2013.01); *G01S 3/808* (2013.01); *G01S 5/18* (2013.01); *G01S 2205/06* (2020.05); *H04R 1/08* (2013.01); *H04R 3/00* (2013.01)

(58) Field of Classification Search
CPC ..... G01S 5/22; G01S 5/18; G01S 5/20; G01S 3/808
(Continued)

(56) References Cited

U.S. PATENT DOCUMENTS 6,178,141 B1    1/2001  Duckworth et al.
7,126,877 B2   10/2006  Barger et al.
(Continued)

FOREIGN PATENT DOCUMENTS

EP         1806952        7/2007
KR    10-2015-0000441     1/2015
(Continued)

OTHER PUBLICATIONS

WO PCT/US2020/033167 IPRP, dated Nov. 16, 2021, Batelle Memorial Institute.
(Continued)

*Primary Examiner* — Ian J Lobo
(74) *Attorney, Agent, or Firm* — Wells St. John P.S.

(57) ABSTRACT

Firearm discharge location systems and methods are described. According to one aspect, a firearm discharge location system includes a plurality of microphones spaced from one another, timing circuitry configured to generate a plurality of asynchronous timing references, wherein data capture operations with respect to the microphones of a first pair are synchronized with one another using a first of the timing references and data capture operations with respect to the microphones of a second pair are synchronized with one another using a second of the timing references, and pro-
(Continued)

cessing circuitry configured to use outputs of the first and second pairs of the microphones to identify a location of a firearm discharge.

21 Claims, 6 Drawing Sheets

(51) Int. Cl.
  *G01S 5/18* (2006.01)
  *H04R 1/08* (2006.01)
  *H04R 3/00* (2006.01)
(58) Field of Classification Search
  USPC .......................................... 367/124, 127, 129
  See application file for complete search history.

(56) References Cited

U.S. PATENT DOCUMENTS

| | | | |
|---|---|---|---|
| 7,433,266 | B2 | 10/2008 | Ledeczi et al. |
| 7,796,470 | B1 | 9/2010 | Lauder et al. |
| 8,005,631 | B2 | 8/2011 | Barger et al. |
| 8,325,563 | B2 * | 12/2012 | Calhoun .................... G01S 5/20 367/129 |
| 9,689,966 | B2 | 6/2017 | Damarla |
| 10,089,845 | B2 | 10/2018 | Skorpik et al. |
| 10,290,195 | B2 | 5/2019 | Skorpik et al. |
| 10,741,038 | B2 | 8/2020 | Skorpik et al. |
| 10,816,640 | B2 | 10/2020 | Xie et al. |
| 11,112,418 | B1 | 9/2021 | Holmes et al. |
| 2001/0004601 | A1 | 6/2001 | Drane et al. |
| 2003/0214405 | A1 | 11/2003 | Lerg et al. |
| 2004/0036602 | A1 | 2/2004 | Lerg |
| 2004/0100868 | A1 | 5/2004 | Patterson, Jr. et al. |
| 2007/0159924 | A1 | 7/2007 | Vook et al. |
| 2008/0165621 | A1 | 7/2008 | Fisher et al. |
| 2008/0219100 | A1 | 9/2008 | Fisher et al. |
| 2008/0267012 | A1 | 10/2008 | Fisher et al. |
| 2010/0118658 | A1 | 5/2010 | Showen et al. |
| 2013/0192451 | A1 | 8/2013 | Scott et al. |
| 2013/0206901 | A1 | 8/2013 | Herman et al. |
| 2014/0269199 | A1 | 9/2014 | Weldon et al. |
| 2014/0314250 | A1 * | 10/2014 | Park ........................ G01S 5/30 381/92 |
| 2015/0345907 | A1 | 12/2015 | Varga et al. |
| 2016/0063987 | A1 | 3/2016 | Xu et al. |
| 2016/0260307 | A1 | 9/2016 | Skorpik et al. |
| 2017/0003376 | A1 | 1/2017 | Wellman et al. |
| 2017/0123038 | A1 | 5/2017 | Griggs et al. |
| 2017/0169686 | A1 | 6/2017 | Skorpik et al. |
| 2017/0180926 | A1 | 6/2017 | Doherty |
| 2017/0234966 | A1 | 8/2017 | Naguib et al. |
| 2017/0328683 | A1 | 11/2017 | Smith |
| 2017/0328983 | A1 | 11/2017 | Volgyesi et al. |
| 2018/0105270 | A1 | 4/2018 | Xu et al. |
| 2018/0164397 | A1 | 6/2018 | Griggs et al. |
| 2018/0306890 | A1 * | 10/2018 | Vatcher ................. G01S 3/8083 |
| 2018/0356492 | A1 | 12/2018 | Hamilton |
| 2019/0101613 | A1 | 4/2019 | Griggs et al. |
| 2019/0162812 | A1 | 5/2019 | Sloan |
| 2019/0212186 | A1 | 7/2019 | Warren et al. |
| 2019/0228629 | A1 | 7/2019 | Skorpik et al. |
| 2019/0281259 | A1 | 9/2019 | Palazzolo |
| 2020/0355780 | A1 | 11/2020 | Griggs et al. |
| 2021/0021763 | A1 | 1/2021 | Zhou et al. |
| 2021/0080570 | A1 | 3/2021 | Gonzalez et al. |
| 2021/0304784 | A1 | 9/2021 | Paine |

FOREIGN PATENT DOCUMENTS

| | | |
|---|---|---|
| WO | WO 2009/085361 | 7/2009 |
| WO | WO 2010/039130 | 4/2010 |
| WO | WO 2016/029469 | 3/2016 |
| WO | WO 2020/236607 | 11/2020 |
| WO | WO 2021/046062 | 3/2021 |

OTHER PUBLICATIONS

WO PCT/US2020/033167 Search Rept., dated Oct. 5, 2020, Batelle Memorial Institute.
WO PCT/US2020/033167 Writ. Opin., dated Oct. 5, 2020, Batelle Memorial Institute.
WO PCT/US2020/048957 Search Rept., dated Dec. 15, 2020, Battelle Memorial Institute.
WO PCT/US2020/048957 Writ. Opin., dated Dec. 15, 2020, Batelle Memorial Institute.
Albert et al., "Time Reversal Processing for Source Location in an Urban Environment", The Journal of the Acoustical Society of America, Aug. 2005, United States, pp. 616-619.
Albert, "Low Frequency Acoustic Pulse Propagation in Temperate Forests", The Journal of the Acoustical Society of America, Aug. 2015, United States, pp. 735-747.
Beck et al., "Variations in Recorded Acoustic Gunshot Waveforms Generated by Small Firearms", The Journal of the Acoustical Society of America, Apr. 2011, United States, pp. 1748-1759.
Freire, "Robust Direction-of-Arrival by Matched-Lags, Applied to Gunshots", The Journal of the Acoustical Society of America, Jun. 2014, United States, pp. 246-251.
Gonzalez et al., "Portal System for Real-Time Gunshot Detection, Localization, Alerting, and Recording", PNNL-SA-147910 Report, Dec. 12, 2019, United States, 9 pages.
Gonzalez et al., U.S. Appl. No. 62/849,877, filed May 18, 2019, titled "Low-Cost Highly Accurate Microphone Array for Echo-Location of Gunshots", 53 pages.
Gonzalez et al., U.S. Appl. No. 62/895,397, filed Sep. 3, 2019, titled "Portable System for Real-Time Gunshot Detection, Localization, Alert, and Recording", 15 pages.
Hughes et al., "Joint Entropy of Continuously Differentiable Ultrasonic Waveforms", The Journal of the Acoustical Society of America, Jan. 2013, United States, pp. 283-300.
Hughes et al., U.S. Appl. No. 17/547,665, filed Dec. 10, 2021, titled "Waveform Emission Location Determination Systems and Associated Methods", 40 pages.
Luzi et al., "Acoustic Firearm Discharge Detection and Classification in an Enclosed Environment", The Journal of the Acoustical Society of America, May 2016, United States, pp. 2723-2731.
Mehra et al., "Acoustic Pulse Propagation in an Urban Environment Using a Three-Dimensional Numerical Simulation", The Journal of the Acoustical Society of America, Jun. 2014, United States, pp. 3231-3242.
Mohan et al., "Localization of Multiple Acoustic Sources with Small Arrays Using a Coherence Test", The Journal of the Acoustical Society of America, Apr. 2008, United States, pp. 2136-2147.
Muhlestein et al., "Acoustic Pulse Propagation in Forests", The Journal of the Acoustical Society of America, Feb. 2018, United States, pp. 968-979.
PNNL, "Portal System for Real-Time Gunshot Detection, Localization, Alerting, and Recording", PNNL-SA-147910 Brochure, 2019, United States, 1 page.
Seybold, "Introduction to RF Propagation", Wiley-Interscience, John Wiley & Sons, Inc., 2005, United States, 342 pages.
Wikipedia, "68-95-99.7 Rule", available online at https://en.wikipedia.org/wiki/68%E2%80%9395%E2%80%9399.7_rule, Apr. 8, 2019, 4 pages.
Wu et al., "Blind Extraction and Localization of Sound Sources Using Point Sources Based Approaches", The Journal of the Acoustical Society of America, Aug. 2012, United States, pp. 904-917.
Wu et al., "Passive Sonic Detection and Ranging for Locating Sound Sources", The Journal of the Acoustical Society of America, Jun. 2013, United States, pp. 4054-4064.
WO PCT/US2020/048957 IPRP, dated Mar. 8, 2022, Batelle Memorial Institute.

\* cited by examiner

FIREARM DISCHARGE LOCATION SYSTEMS AND METHODS

RELATED PATENT DATA

This application is a 35 U.S.C. § 371 of and claims priority to PCT International Application Number PCT/US2020/033167, which was filed 15 May 2020, which was published in English, and which claims the benefit of U.S. Provisional Patent Application Ser. No. 62/849,877, filed May 18, 2019, titled "Low-Cost Highly Accurate Microphone Array for Echo-Location of Gunshots," the disclosures of which are incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to firearm discharge location systems and methods.

BACKGROUND OF THE DISCLOSURE

Incidents involving active shooters which include shootings in confined environments, such as a school or classroom, shopping mall, airport, train station as well as in open spaces have been increasing yearly and some statistics indicate that a life is lost every 15 seconds due to shootings.

Rapid identification of the location of a firearm discharge allows first responders to locate and engage the shooter as quickly as possible as well as search for potential victims. Information related to the detection and location of the shooter can be some of the most critical information provided to first responders.

Firearm discharges such as gunshots are significant energy events having both large audio decibel levels and long signal durations of up to half a second. Both of these attributes are enhanced by reflections from walls, ceilings, floors and other items, which can increase signal duration by the associated delayed arrival of the signal multi-paths. The large amounts of energy released by a weapon discharge also generate significant nonlinearities which can result in the generation of higher harmonics and signal perturbations. The sound of the firearm discharge itself, the sound of the bullet impacting an object, the proximity or distance from the gunshot, and reflections off of other objects can all impact the shock wave or shock front from the firearm discharge and provide distortion.

Aspects of the present disclosure described below are directed to firearm discharge location systems and related methods that enable accurate determination of a location of a firearm discharge.

BRIEF DESCRIPTION OF THE DRAWINGS

Example embodiments of the disclosure are described below with reference to the following accompanying drawings.

DETAILED DESCRIPTION OF THE DISCLOSURE

The present disclosure is directed to sensor systems and associated methods that can detect and analyze firearm discharges in multiple environments, including both confined environments as well as open outdoor environments, and determine additional information, such as location of the firearm discharge (e.g., gunshot) and the number of rounds fired. In some embodiments described herein, plural intersecting hyperbolas and acoustic source localization are used to identify the location of a shooter within an area being monitored.

Figure 1:
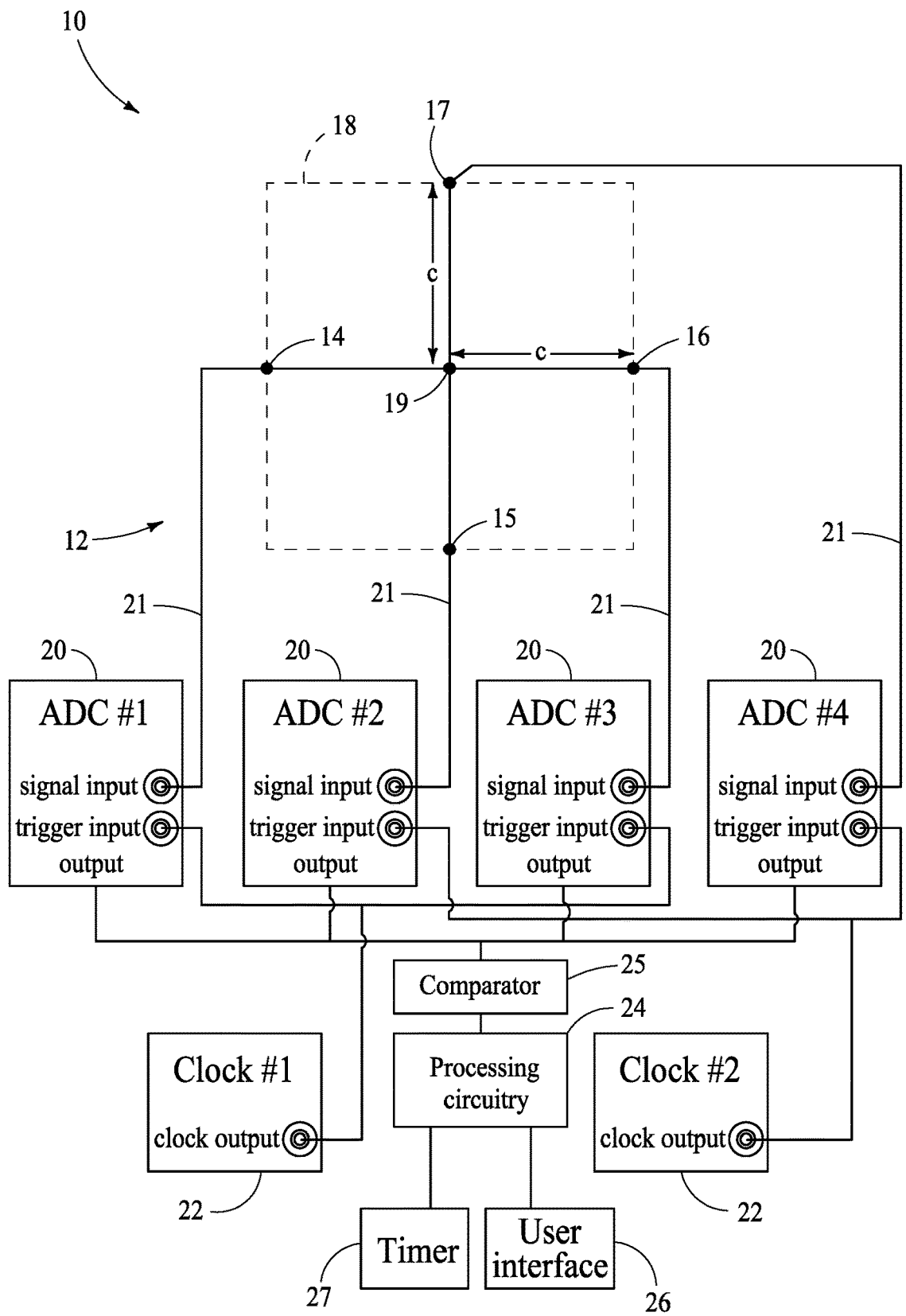
FIG. 1 is an illustrative representation of a firearm discharge location system according to one embodiment.

Referring to FIG. 1, a firearm discharge location system 10 is shown according to one embodiment. The system 10 includes a microphone array 12, a plurality of analog-to-digital converters (ADCs) 20, a plurality of clocks 22, processing circuitry 24, a comparator 25, a user interface 26 and a timer 27 in the illustrated configuration. Other embodiments are possible including more, less and/or alternative components.

In FIG. 1, microphone array 12 is configured as a quad microphone array including four microphones 14-17 that are spaced from one another in two dimensions and positioned to receive acoustic signals from an indoor or outdoor area 18 being monitored. Example microphones that may be utilized include either model number VM1000 or VM3000 available from Vesper Technologies Inc., or a model INMP404 available from TDK InvenSense.

The microphones 14-17 are arranged generally in the shape of a cross in the depicted embodiment. The acoustic signals received by the microphone array 12 are processed to provide information regarding a location of a shooter/firearm discharge within area 18 (as well as determining locations of firearm discharges within regions adjacent to area 18).

The illustrated microphones 14-17 of the array 12 are positioned at a preselected distance (i.e., microphone spacing parameter c) from an origin or center 19 and monitor the area 18 generally in the shape of a square in the illustrated embodiment. Microphones 14-17 are located at midpoints of the sides of the square area 18 in FIG. 1.

The area 18 within a perimeter defined by the placement of microphones 14-17 is the primary area to be monitored although system 10 can process signals received by the microphones 14-17 that originate from outside of the area 18 if the acoustic wave of the firearm discharge outside of area 18 is received by microphones 14-17. System 10 has increased sensitivity and accuracy for locating firearm discharges that occur within area 18 compared with those that originate outside of area 18, and in typical applications, the placement of the microphones 14-17 defines the perimeter of the primary area to be monitored.

The system 10 may be utilized in many different applications and monitor areas 18 of many different sizes. The values of microphone spacing parameter c may vary greatly depending upon the application, for example from 0.5 m to hundreds or perhaps thousands of meters depending upon the sensitivity of the microphones to receive acoustic waveforms of sufficient energy from firearm discharges.

Details regarding processing of acoustic signals received by the microphone array 12 are discussed below according to example embodiments.

ADCs 20 are each coupled with a respective one of the microphones 14-17 via a plurality of wired connections 21 in one embodiment. Connections 21 are coupled with signal inputs of the ADCs 20 and ADCs 20 sample analog electrical signals from the microphones 14-17 to provide a plurality of digital data samples to implement data capture operations with respect to microphones 14-17 in the described embodiment. In one embodiment, ADCs 20 are each implemented using model ADC12DL080 available from Texas Instruments.

In some implementations, the microphone array 12 is arranged adjacent to the area 18 to be monitored and the remaining components of system 10 are implemented in a base station (not shown). For applications of larger areas to be monitored, the ADCs 20 may be co-located with the respective microphones 14-17 and wireless clock signals from clocks 22 in the base station may be communicated to the respective ADCs 20 and data samples from the ADCs 20 may be wirelessly communicated to comparator 25 in the base station in one embodiment.

Microphone array 12 includes plural independent (i.e., asynchronous) pairs of synchronized microphones in one embodiment. In addition, timing circuitry provides a plurality of independent clock signals to independently synchronize respective pairs of the microphones in the described embodiment. One arrangement of the timing circuitry includes a plurality of independent clocks 22 configured to generate a plurality of independent asynchronous timing or clock signals or references. In one embodiment, clocks 22 are each configured to generate an independent clock signal having the same frequency within an example range of 1-40 MHz.

The clock and sampling frequency is determined by location precision requirements and maximum allowed separation between the microphones within each pair. If the microphones pairs are close together (e.g., less than 1 m) a frequency in the upper end of the range may be utilized and if the microphones of a pair are further apart (e.g., greater than 1 m), a frequency in the lower range may be utilized.

A first of pair of the microphones 14, 16 receive a first timing reference from a first of the clocks 22 and the first timing reference operates to synchronize data capture operations of the first pair of microphones 14, 16. The data capture operations include sampling of analog signals outputted from the microphones 14, 16 to generate a plurality of data samples in one embodiment.

In the embodiment of FIG. 1, the first pair of microphones 14, 16 is oriented along an axis that is orthogonal or at a right angle with respect to an axis of the second pair of microphones 15, 17. In addition, microphones 14, 16 of the first pair are located at opposite first and second sides of the square area 18 and the microphones 15, 17 of the second pair are located at opposite third and fourth sides of the square area 18. The first and second pairs of microphones are co-located in the depicted embodiment.

In one embodiment, the first timing reference controls the timing of the data conversion operations of the first and third ADCs 20 and corresponding sampling of signals from respective microphones 14, 16. The data capture operations of the first pair of microphones 14, 16 are considered to be synchronized with one another. Furthermore, the data capture operations of a second pair of microphones 15, 17 are considered to be synchronized with one another using a second timing reference in the illustrated embodiment.

The data capture operations of the first and second pairs of microphones are considered to be asynchronous with respect to one another in the described embodiment. Data capture operations of the first pair of microphones 14, 16 are synchronized with the first timing reference and are asynchronous with respect to data capture operations of the second pair of microphones 15, 17 that are synchronized with the second timing reference. The electronics utilized for determination of the location of the firearm discharge may be simplified if synchronization of all microphones of the array 12 is not implemented in some embodiments discussed herein.

In one embodiment, processing circuitry 24 is configured to implement desired programming provided by appropriate computer-readable storage media in at least one embodiment. For example, the processing circuitry 24 may be implemented as one or more processor(s) and/or other structure configured to execute executable instructions including, for example, software and/or firmware instructions. Other example embodiments of processing circuitry 24 include hardware logic, PGA, FPGA, ASIC, state machines, and/or other structures alone or in combination with one or more processor(s). These examples of processing circuitry 14 are for illustration and other configurations are possible.

Processing circuitry 24 accesses storage circuitry (not shown) that is configured to store programming, such as executable code or instructions (e.g., software and/or firmware), electronic data, databases, or other digital information and may include computer-readable storage media. At least some embodiments or aspects described herein may be implemented using programming stored within storage circuitry and configured to control appropriate processing circuitry 24.

In addition, processing circuitry 24 also controls other operations of firearm discharge location system 10 including data access and storage, and generation of information regarding the position of a shooter as a result of the processing of the signals from the microphones 14-17.

User interface 26 is configured to interact with a user including conveying data to a user. For example, user interface 26 may include a display to depict visual images for observation by the user as well as an input device configured to receive inputs from the user. In one embodiment, the user interface 26 generates a visual image of the area being monitored by the system and displays the location of the firearm discharge within the visual image of the area. User interface 26 may alternatively or additionally display the co-ordinates of the location of the determined firearm discharge.

In one embodiment, timer 27 is implemented as a 16-bit that perpetually counts up and rolls over when reaching its maximum value. The timer 27 increments values at a frequency of approximately 1 MHz in implementation. The output of timer 27 is utilized to generate a plurality of time stamps as described below.

In one embodiment, processing circuitry 24 is configured to use outputs of the microphones 14-17 to identify a location of a firearm discharge as described further below. In the illustrated embodiment, the ADCs 20 are connected to a low-latency input of a comparator 25. Comparator 25 compares data samples outputted by the ADCs 20 to a threshold selected to filter out or remove acoustic waves received by the microphones 14-17 having intensities less than those resulting from a firearm discharge. Processing circuitry 24 is configured to continuously monitor outputs of comparator 25 from the microphones 14-17 to determine if any of the data samples from the microphones 14-17 triggered the threshold.

If a data sample exceeds the threshold (i.e., corresponding to receipt of an acoustic wave front having the sufficient energy of a firearm discharge by the respective microphone), the processing circuitry 24 records the event along with an associated time stamp from timer 27 indicating the moment in time when the data sample from one of the microphones 14-17 triggered the comparator 25 as well as an indication of the specific microphone 14-17 from which the data sample came from.

Accordingly, data samples from microphones 14-17 corresponding to a firearm discharge from a shooter at location 30 would be associated with different time stamps as a result of the microphones 14-17 being placed at different distances from the location 30 of the shooter. The time stamps are processed to determine first and second time differences of signals arriving at the microphones of respective ones of the first and second pairs as discussed below in illustrative embodiments.

In one embodiment, the sound wave front's arrival times at each microphone of a synchronized pair can be cross-correlated by system 10 with sub-microsecond precision. By analyzing the respective time stamps of the data samples from the synchronized pair of microphones, a time difference is determined indicative of the amount of time between an acoustic wave generated by a firearm discharge being received at the different microphones of a synchronized pair.

In one embodiment, the processing circuitry 24 calculates a first time difference indicative of the amount of time between the firearm discharge being received at the different microphones 14, 16 of a first pair and a second time difference indicative of the amount of time between the firearm discharge being received at the different microphones 15, 17 of a second pair. The processing circuitry 24 processes the time differences of the respective pairs of synchronized microphones to determine the location of the firearm discharge as discussed further below with respect to FIGS. 2A-2D.

In some embodiments, the microphones 14-17 may be installed at locations above the ground, such as 10 meters, using towers to provide increased sensitivity to the acoustic signals and increased sensing range compared with arrangements where the microphones 14-17 are installed close to the ground.

A plurality of microphones 14-17 are placed about an area 18 to be monitored in the above-described embodiment of FIG. 1. In other embodiments, the microphones 14-17 are positioned at center 19 of an area to be monitored and are arranged closer together (e.g., microphone spacing parameter c=0.5-1 meter apart). This arrangement can provide location information regarding a firearm discharge within a relatively large area such as hundreds or thousands of meters away from the microphone array as long as the acoustic signal of sufficient energy corresponding to the firearm discharge is received by the microphones of the array.

Components of the firearm discharge location system may be co-located with the microphone array or located in a base station remote from the microphone array. In some arrangements, wired or wireless connections are used to communicate appropriate signals, such as clock or timing reference signals and outputs of the microphones, between the microphone array and the base station. In one more specific embodiment, the ADCs 20 are co-located with the microphone array and the remaining components are implemented using the base station. In one embodiment, provision of a timing accuracy between synchronized pairs of microphones of ±15 μs enables accurate location information to be determined within ±0.1 m out to a distance of at least 225 m from the microphone array installed at a center of area 18 to be monitored.

Referring to FIGS. 2A-2D, the firearm discharge location system 10 utilizes intersecting hyperbolas to provide information regarding a location 30 of a shooter within an area being monitored according to one embodiment. One example of the system 10 determines the points of intersection of the hyperbolas determined by the time differences of signals outputted by the independent pairs of orthogonally oriented synchronously triggered microphones as discussed in detail below.

Figure 2A:
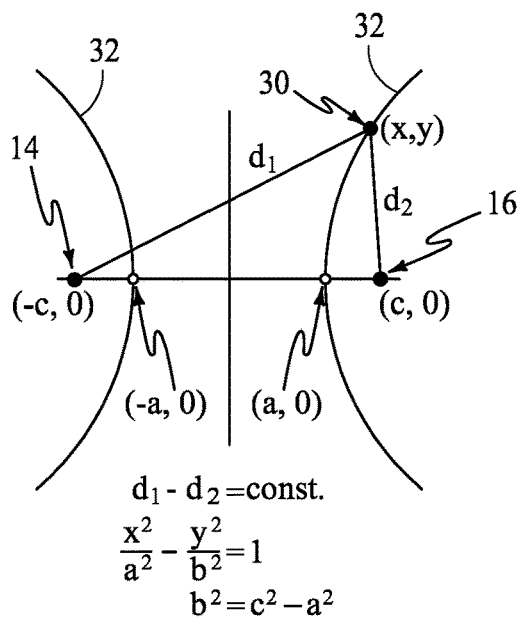
FIGS. 2A-2D are graphical representations of intersecting hyperbolas according to one embodiment.
Figure 2B:
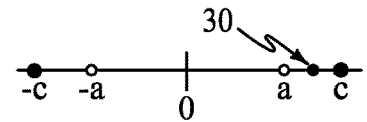

In FIGS. 2A and 2B, data capture operations of the first pair of microphones 14, 16 are described. Microphones 14, 16 are arranged along the x axis at respective coordinates (−c, 0) and (c, 0). Acoustic signals, such as a firearm discharge, generated within the area being monitored are received by microphones 14, 16 at different moments in time if the location 30 of a shooter is different distances from microphones 14, 16 as shown.

Processing circuitry 24 is configured to determine a time difference indicative of the amount of time between the firearm discharge being received at the different microphones 14, 16 of the first pair at different moments in time by analyzing the respective time stamps of the data samples from the microphones 14, 16.

Figure 2C:
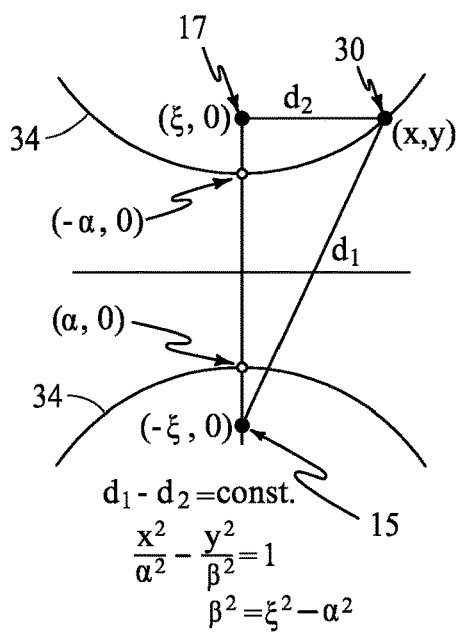
Figure 2D:
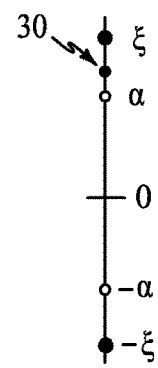

In FIGS. 2C and 2D, data capture operations of the second pair of microphones 15, 17 are described. Microphones 15, 17 are arranged along the x axis at respective coordinates (−ς, 0) and (ς, 0). As mentioned above, the data capture operations of the second pair of microphones 15, 17 are synchronized with one another using a common timing reference. Acoustic signals of the firearm discharge are also received by microphones 15, 17 of the second pair at different moments in time and the processing circuitry uses the respective time stamps of the corresponding data samples to determine the time difference of the arrival of the acoustic wave from the firearm discharge at microphones 15, 17 of the second pair.

FIGS. 2A and 2B show the hyperbola 32 of possible shooter positions resulting from a firearm discharge from a shooter at location 30 and consistent with the difference in acoustic signal arrival time between the first pair of synchronously triggered microphones 14, 16.

The equations of the hyperbola 32 depicted in FIG. 2A are $$\frac{x^2}{a^2} - \frac{y^2}{b^2} = 1 \qquad \text{Equation 1}$$

$$b^2 = c^2 - a^2 \qquad \text{Equation 2}$$

A microphone spacing parameter c is the distance from the center 19 of the array to the microphones and is chosen during the design of the microphone array and is therefore known. The time difference in signal arrival time at the microphones 14, 16, Δt, is also known as mentioned above along with the speed of sound $v_s$.

The parameter a of equation 1 may be determined as discussed with reference to FIG. 2B which depicts the case where the shooter is located on the x-axis between the positive vertex at (a, 0) and the focal point at (c, 0) (the foci are also the locations of the horizontal pair of microphones 14, 16). Analysis of this situation enables determination of the value of parameter a according to $$a = \frac{v_s \Delta t}{2} \qquad \text{Equation 3}$$

Using the determined value of parameter a, parameter b may be determined using equation 2.

Referring to FIGS. 2C and 2D, the hyperbola 34 of possible shooter positions resulting from a firearm discharge from a shooter at location 30 and consistent with the difference in acoustic signal arrival time between the second pair of synchronously triggered microphones 14, 16.

The equation of the hyperbola 34 depicted in FIG. 2C is $$\frac{x^2}{\alpha^2} - \frac{y^2}{\beta^2} = 1 \qquad \text{Equation 4}$$

$$\alpha = \frac{v_s \Delta t}{2} \qquad \text{Equation 5}$$

The parameter ζ is chosen during the design of the microphone array and is therefore known. The difference in signal arrival time at the microphones 15, 17, Δt is also known as mentioned above along with the speed of sound $v_s$. The parameter α of equation 4 may be determined as discussed with reference to FIG. 2D similar to the discussion above with respect to the first pair of microphones. Analysis of this situation enables determination of the value of parameter α using equation 5.

Using the determined value of parameter α, parameter β may be determined using equation 6

$$\beta^2 = \zeta^2 - \alpha^2 \qquad \text{Equation 6}$$

Thereafter, the following simultaneous equations may be solved to determine the intersections of the hyperbolae 32, 34

$$\frac{x^2}{a^2} - \frac{y^2}{b^2} = 1 \qquad \text{Equation 7}$$

$$\frac{y^2}{\alpha^2} - \frac{x^2}{\beta^2} = 1 \qquad \text{Equation 8}$$

These become $$\frac{x^2}{a^2} - \frac{y^2}{b^2} = 1 \qquad \text{Equation 9}$$

$$-\frac{x^2}{\beta^2} + \frac{y^2}{\alpha^2} = 1 \qquad \text{Equation 10}$$

Or, using $X = x^2$ and $Y = y^2$ $$\frac{1}{a^2} X^2 - \frac{1}{b^2} Y^2 = 1 \qquad \text{Equation 11}$$

$$-\frac{1}{\beta^2} X^2 + \frac{1}{\alpha^2} Y^2 = 1 \qquad \text{Equation 12}$$

These may be solved using Cramer's rule $$X = \frac{\begin{vmatrix} 1 & -\frac{1}{b^2} \\ 1 & \frac{1}{\alpha^2} \end{vmatrix}}{\begin{vmatrix} \frac{1}{a^2} & -\frac{1}{b^2} \\ -\frac{1}{\beta^2} & \frac{1}{\alpha^2} \end{vmatrix}} \qquad \text{Equation 13}$$

$$Y = \frac{\begin{vmatrix} \frac{1}{a^2} & 1 \\ -\frac{1}{\beta^2} & 1 \end{vmatrix}}{\begin{vmatrix} \frac{1}{a^2} & -\frac{1}{b^2} \\ -\frac{1}{\beta^2} & \frac{1}{\alpha^2} \end{vmatrix}} \text{ Or} \qquad \text{Equation 14}$$

$$X = \frac{\frac{1}{\alpha^2} + \frac{1}{b^2}}{\frac{1}{(a\alpha)^2} - \frac{1}{(b\beta)^2}} = \frac{(b\alpha\beta)^2 + (a\alpha\beta)^2}{(b\beta)^2 - (a\alpha)^2} \qquad \text{Equation 15}$$

$$Y = \frac{\frac{1}{a^2} + \frac{1}{\beta^2}}{\frac{1}{(a\alpha)^2} - \frac{1}{(b\beta)^2}} = \frac{(ba\beta)^2 + (a\alpha\beta)^2}{(b\beta)^2 - (a\alpha)^2} \qquad \text{Equation 16}$$

The square roots of X, Y provide the x, y coordinates corresponding to the location 30 of the shooter.

However, in FIG. 1, there are four quadrants (i.e., upper left, upper right, lower left and lower right) about the origin 15 of the microphone array 12. The x, y coordinates discussed above are ambiguous to sign and the processing circuitry is configured to perform additional processing to identify the specific one of the quadrants containing the xy co-ordinates of location 30 of the firearm discharge using the first and second time differences.

In one embodiment, the signs of the time differences $\Delta t_v$, $\Delta t_h$ of the two pairs of microphones are used to determine the specific quadrant that includes the location of the shooter 30 in accordance with Table A. In the example of Table A with respect to FIG. 1, quadrant I is the upper right portion of area 18, quadrant II is the upper left, quadrant III is the lower left, and quadrant IV is the lower right.

TABLE A

| $\Delta t_v$ | $\Delta t_h$ | Quadrant |
| --- | --- | --- |
| positive | positive | I |
| positive | negative | IV |
| negative | positive | II |
| negative | negative | III |

For example, if the time difference $\Delta t_h$ of the first pair of microphones 14, 16 is positive and the time difference of the second pair of microphones 15, 17 is positive, this indicates that the location 30 of the shooter is in the upper right quadrant of the area being monitored.

Accordingly, in one embodiment, the firearm discharge location system uses data samples corresponding to acoustic signals received from a microphone array to identify the location of the firearm discharge in x, y co-ordinates in one of a plurality of different quadrants.

Figure 3:
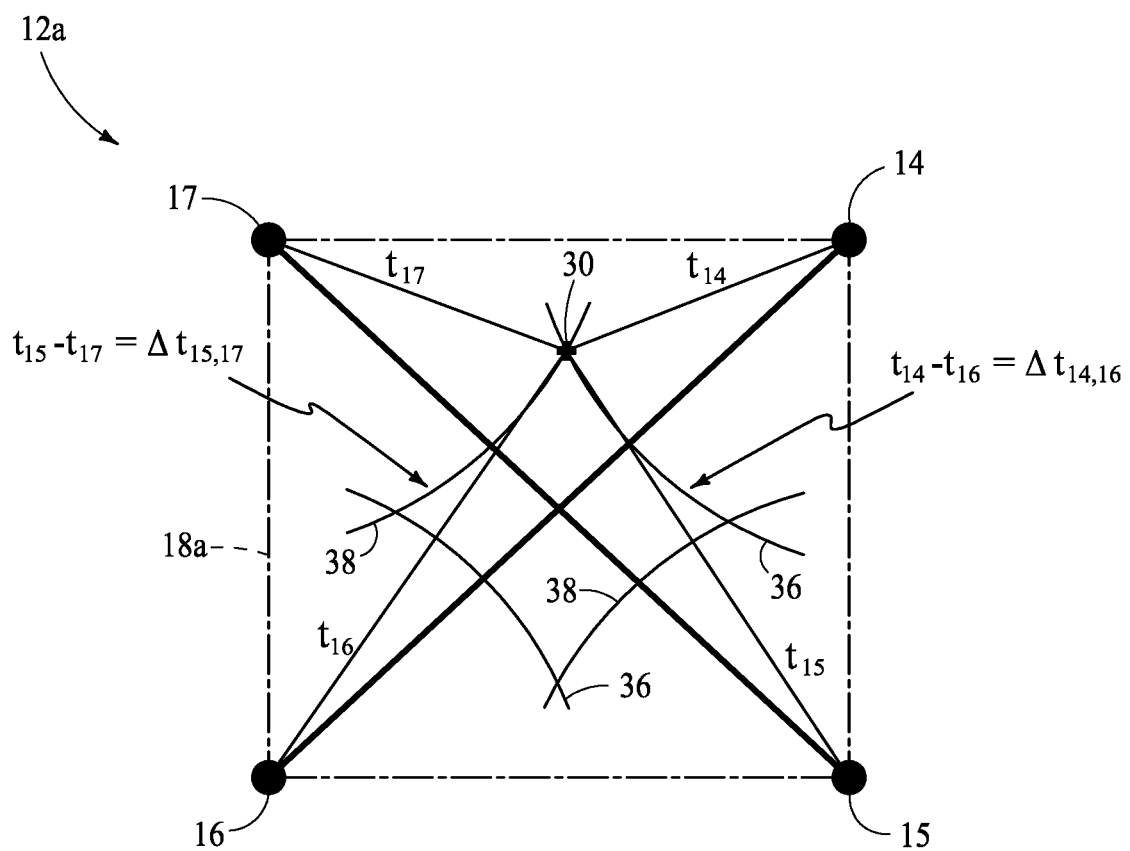
FIG. 3 is an illustrative representation of a microphone array according to one embodiment.

Referring to FIG. 3, another microphone array 12a is shown according to an additional embodiment. The microphones 14, 15, 16, 17 of array 12a are positioned at the corners of the area 18a being monitored in the shape of a square in the illustrated configuration.

The location 30 of a firearm discharge 30 is determined using plural intersecting hyperbolas in one embodiment. The location 30 along hyperbola 36 is determined by processing data samples from microphones 14, 16 using a time difference $t_{14}$-$t_{16}$ corresponding to the time for the acoustic signals from the firearm discharge to arrive at microphones 14, 16 from location 30. The location 30 along hyperbola 38 is determined by processing data samples from microphones 15, 17 using a time difference $t_2$-$t_4$ corresponding to the time for the acoustic signals from the firearm discharge to arrive at microphones 15, 17 from location 30.

Figure 4:
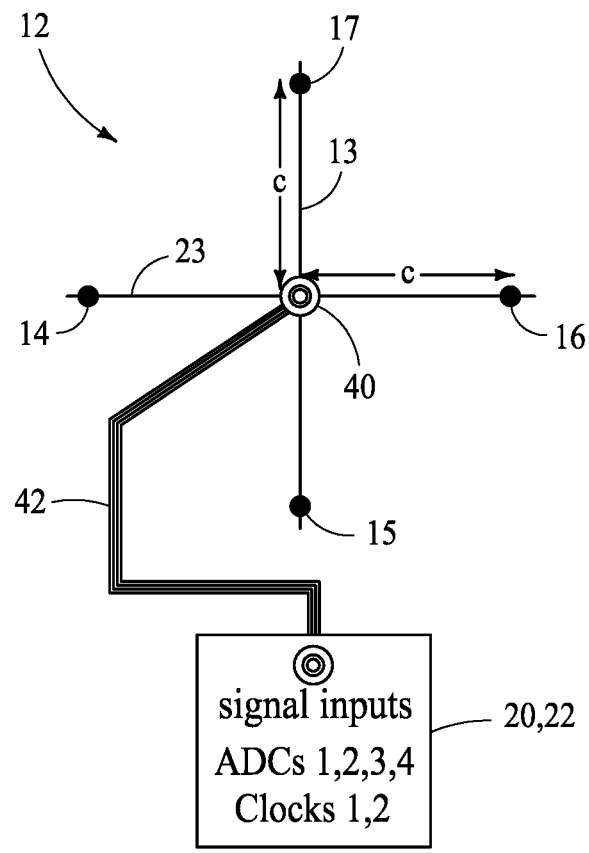
FIG. 4 is an illustrative representation of a microphone array and associated circuitry according to one embodiment.

Referring to FIG. 4, a quad microphone array 12 having four microphones 14-17 arranged in a cross is shown according to one embodiment. A plurality of wired or wireless connections 13 communicate signals between microphones 14-17 and a hub 40. A bus 42 further communicates the signals between ADCs 20 and clocks 22 and hub 40.

It is noted that sensitivity of a pair of dual independently-synchronized microphones (i.e., quad microphone array) arranged in a cross falls to a minimum on two lines at forty-five degrees relative to the horizontal and vertical axes of the array 12. In one embodiment, sensitivity may be improved by also using another quad array including two pairs of dual independently-synchronized microphones as discussed immediately below.

Figure 5:
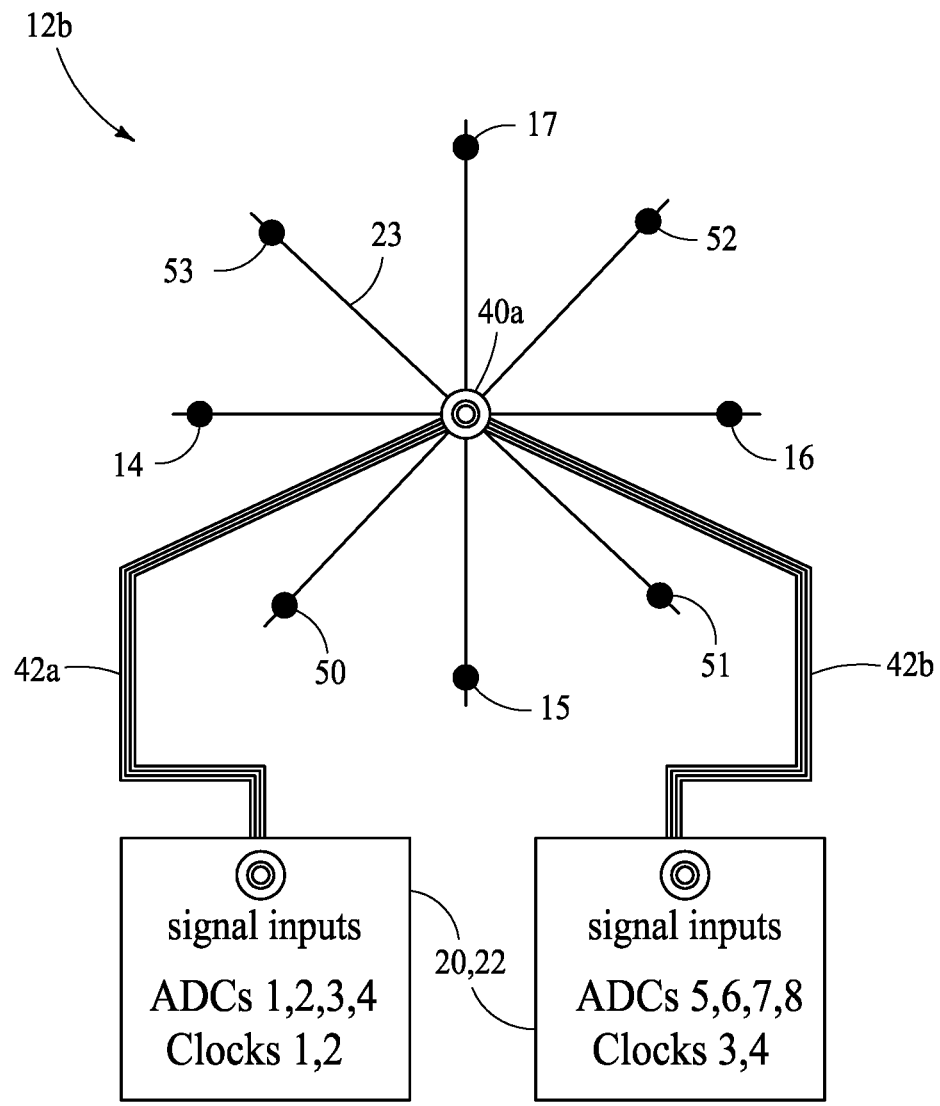
FIG. 5 is an illustrative representation of a microphone array and associated circuitry according to one embodiment.

Referring to FIG. 5, an octagonal microphone array 12b including two quad arrays is shown according to one embodiment. A first quad array includes microphones 14-17 and a second quad array includes microphones 50-53.

Microphones 50, 52 form a third synchronized pair and microphones 51, 53 form a fourth synchronized pair of the second quad array and the four pairs of microphones are synchronized independently (or asynchronously) of each other for data capture operations, for example using four independent clocks in one embodiment. The first quad array includes a first pair of microphones 14, 16 and a second pair of microphones 15, 17 as discussed above. The second quad array includes a first pair of microphones 50, 52 and a second pair of microphones 51, 53.

The quad arrays are co-centered and are offset with respect to one another by forty-five degrees in the illustrated example. In addition, the four pairs of microphones implement data capture or sampling operations independently or asynchronously with respect to one another in one embodiment. In other embodiments, the quad arrays are not co-centered and/or may be offset with respect to each other by other non-zero angles in other embodiments.

A plurality of wired or wireless connections 23 communicate signals from the microphones 14-17, 50-53 to a hub 40a. A bus 42a communicates signals for the first quad array between the hub 40a and the ADCs 20 and clocks 22 shown on the left and a bus 42b communicates signals for the second quad array between the hub 40a and the ADCs 20 and clocks 22 shown on the right.

In one embodiment, the processing circuitry receives and processes data samples of the signals generated by the microphones 14-17, 50-53 to determine the location of a firearm discharge. In one embodiment, the system 10 separately processes the data samples from each quad array as discussed above providing two locations of a firearm discharge. In particular, in addition to using the outputs of the first quad array to identify a first location of the firearm discharge, the system is further configured to use the outputs of the third and fourth pairs of the microphones to identify a second location of the firearm discharge using data from the second quad array. Thereafter, the processing circuitry is configured to combine (e.g., average) the first and second locations resulting from the data samples of each respective first and second quad array to provide a third final location of the firearm discharge in one embodiment.

Addition of another array co-centered and oriented orthogonally to the plane of the aforementioned quad or octagonal arrays enables determination of the location of a firearm discharge in three dimensions.

Figure 6:
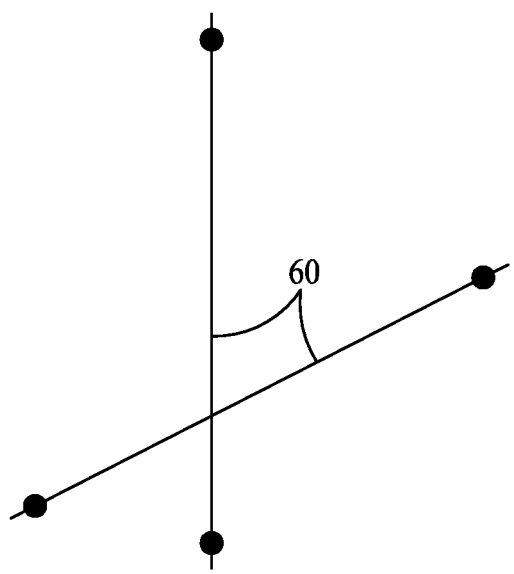
FIG. 6 is an illustrative representation of a quad array including two non-parallel pairs of synchronized microphones according to one embodiment.
Figure 7:
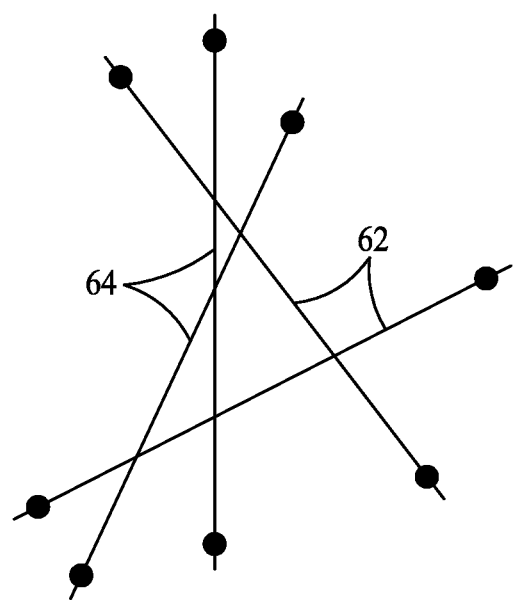
FIG. 7 is an illustrative representation of an octagonal array including four non-parallel pairs of synchronized microphones according to one embodiment.

The embodiments discussed above are with respect to co-centered, orthogonally oriented synchronized pairs of microphones (i.e., the axes between the microphones of the respective pairs are orthogonal to one another). In other embodiments, such as the examples shown in FIGS. 6 and 7, the axes of the independent pairs of synchronized microphones are non-parallel with respect to one another but not necessarily orthogonal. In addition, the synchronized pairs of microphones are not co-centered in some embodiments as shown in FIGS. 6 and 7. The axes of the independent pairs of synchronized microphones intersect and divide the area to be monitored into four distinct half planes in the illustrated example embodiments.

Referring to FIG. 6, a quad array including two independent pairs 60 of synchronized microphones that are not parallel with respect to one another are shown. Referring to FIG. 7, a first quad array of the illustrated octagonal array includes two independent pairs 62 of synchronized microphones that are not parallel with respect to one another. A second quad array includes two independent pairs 64 of synchronized microphones that are not parallel with respect to one another. The outputs of the microphones of the embodiments of FIGS. 6 and 7 may be processed as discussed above with respect to the orthogonal microphone arrays in one embodiment. Different pairs of the microphones illustrated in FIG. 7 that intersect one another may be selected to form the quad arrays in other embodiments.

In one embodiment, two independent pairs of synchronously triggered microphones generated signals that were useable to detect a shooter 200 m away with an accuracy of 99.7%, and a position accuracy of +/−1 m. Using four pairs of independently synchronized pairs of microphones, it is possible to estimate xy co-ordinates of the shooter within a 400 m by 400 m-grid to within 0.2 m with a probability of actually being correct of 68%, 0.4 m with a probability of actually being correct of 95%, and 0.6 m with a probability of actually being correct of 99.7%. A location of firearm discharge may be determined to within ±0.1 m accuracy using pairs of microphones that are independently synchronized if arrival times of the acoustic wave from the firearm discharge are measured with at least ±15 μs accuracy.

According to some embodiments discussed herein, different pairs of microphones of a microphone array are synchronized independent of each other. These embodiments avoid the complexities inherent with the utilization of a master clock to synchronize all of the microphones of the microphone array. In addition, these embodiments provide increased reliability compared with arrangements which utilize a master clock due to their reduced complexity.

In addition, some of the disclosed embodiments permit the timing references for the different pairs of microphones to drift relative to each other in a random or systematic way as time progresses while still providing accurate results.

Some embodiments of the disclosure described herein may be implemented in portable or permanent installations depending upon the area to be monitored. The disclosed systems and methods extend abilities to locate shooters as well as perform other operations including triggering of ancillary surveillance equipment, and inform first responders to quickly arrive at specific locations resulting in reduced casualties during these events.

Systems and methods discussed herein supplement electronic surveillance and security systems to provide situational awareness and to provide monitoring of "soft targets" such as schools, universities, airports, train stations, large stadium concerts, sporting events, shopping malls, county fairs, construction sites, parking garages, etc. Furthermore, the systems and methods disclosed herein enable quick location information to be determined regarding threats posed by an active shooter to critical infrastructures such as nuclear power generating facilities, military bases, electric substations, etc.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A firearm discharge location system comprising:
a plurality of microphones spaced from one another;
timing circuitry configured to generate a plurality of asynchronous timing references;
wherein data capture operations with respect to the microphones of a first pair are synchronized with one another using a first of the timing references and data capture operations with respect to the microphones of a second pair are synchronized with one another using a second of the timing references; and
processing circuitry configured to use outputs of the first and second pairs of the microphones to identify a location of a firearm discharge.

2. The system of claim 1 wherein the microphones are arranged in a microphone array having two dimensions.

3. The system of claim 1 wherein the processing circuitry is configured to determine a first time difference corresponding to the reception of an acoustic signal of the firearm discharge by the microphones of the first pair at different moments in time, to determine a second time difference corresponding to the reception of the acoustic signal of the firearm discharge by the microphones of the second pair at different moments in time, and to use the first and second time differences to identify the location of the firearm discharge.

4. The system of claim 3 further comprising a plurality of analog-to-digital converters configured to sample analog signals received from respective ones of the microphones and to generate a plurality of data samples to implement the data capture operations, and wherein the processing circuitry is configured to associate a plurality of time stamps with the data samples that exceed a threshold indicative of a certain level of acoustic energy, and use the time stamps to determine the first and second time differences.

5. The system of claim 4 further comprising a comparator coupled with the processing circuitry, wherein the comparator is configured to compare the outputs of the microphones with respect to a threshold, and wherein the processing circuitry is configured to associate a plurality of time stamps with the outputs as a result of respective ones of the outputs exceeding the threshold, and use the time stamps to identify the location of the firearm discharge.

6. The system of claim 3 wherein the firearm discharge location system is configured to monitor for the presence of the firearm discharge within an area comprising a plurality of quadrants, and the processing circuitry is configured to identify one of the quadrants containing the location of the firearm discharge using the first and second time differences.

7. The system of claim 1 wherein the firearm discharge location system is configured to monitor for the presence of the firearm discharge within a square area, and the microphones are located at midpoints of the sides of the square area.

8. The system of claim 7 wherein the microphones of the first pair are located at opposite first and second sides of the square area and the microphones of the second pair are located at opposite third and fourth sides of the square area.

9. The system of claim 1 wherein the firearm discharge location system is configured to monitor for the presence of the firearm discharge within a square area, and at least some of the microphones are located at corners of the square area.

10. The system of claim 1 wherein the microphones are located in a center of an area to be monitored.

11. The system of claim 1 wherein the timing circuitry comprises first and second clocks configured to generate the timing references comprising a plurality of independent clock signals.

12. The system of claim 1 wherein an axis of the microphones of the first pair and an axis of the microphones of the second pair are non-parallel.

13. The system of claim 1 wherein an axis of the microphones of the first pair is orthogonal with respect to an axis of the microphones of the second pair.

14. The system of claim 13 wherein the first and second pairs of the microphones are co-centered.

15. The system of claim 1 further comprising a third pair of the microphones and a fourth pair of the microphones, and wherein the processing circuitry is configured use outputs of the microphones of the third and fourth pairs to identify the location of the firearm discharge.

16. The system of claim 15 wherein data capture operations with respect to the microphones of the third pair are synchronized with one another using a third of the timing references and data capture operations with respect to the microphones of the fourth pair are synchronized with one another using a fourth of the timing references.

17. The system of claim 15 wherein the location of the firearm discharge is a first location, wherein the processing circuitry is configured to process the outputs of the third and fourth pairs of the microphones to identify a second location of the firearm discharge, and wherein the processing circuitry is configured to combine the first and second locations to identify a third location of the firearm discharge.

18. The system of claim 15 wherein the first, second, third and fourth pairs of the microphones are co-centered.

19. The system of claim 18 wherein the first and second pairs of the microphones form a first microphone array, the third and fourth pairs of the microphones form a second microphone array, and the first and second arrays are offset by a non-zero angle with respect to one another.

20. The system of claim 18 wherein the first and second pairs of the microphones form a first microphone array, the third and fourth pairs of the microphones form a second microphone array, and the first and second arrays are offset by forty-five degrees with respect to one another.

21. The system of claim 1 further comprising a plurality of analog-to-digital converters configured to digitize analog signals received from respective ones of the microphones to implement the data capture operations, and wherein the data capture operations of the analog-to-digital converters are controlled by respective ones of the timing references.

* * * * *